(12) United States Patent
Okada et al.

(10) Patent No.: US 12,249,350 B2
(45) Date of Patent: Mar. 11, 2025

(54) METHODS FOR IMPROVING TRACK DENSITY IN DUAL-REEL REMOVABLE TAPE DEVICES AND FIXED TAPE DEVICES

(71) Applicant: Western Digital Technologies, Inc., San Jose, CA (US)

(72) Inventors: Keiichi Okada, Yokohama (JP); Takehiko Hamaguchi, Fujisawa (JP); Akira Sakagami, Kanagawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/229,775

(22) Filed: Aug. 3, 2023

(65) Prior Publication Data

US 2024/0428823 A1     Dec. 26, 2024

Related U.S. Application Data

(60) Provisional application No. 63/523,291, filed on Jun. 26, 2023.

(51) Int. Cl.
| | | |
|---|---|---|
| *G11B 23/087* | (2006.01) | |
| *G11B 5/008* | (2006.01) | |
| *G11B 5/584* | (2006.01) | |
| *G11B 15/32* | (2006.01) | |
| *G11B 27/13* | (2006.01) | |

(52) U.S. Cl.
CPC .... *G11B 23/08714* (2013.01); *G11B 5/00817* (2013.01); *G11B 5/584* (2013.01); *G11B 15/32* (2013.01); *G11B 23/0875* (2013.01); *G11B 27/13* (2013.01); *G11B 2220/655* (2013.01); *G11B 2220/90* (2013.01)

(58) Field of Classification Search
None
See application file for complete search history.

(56) References Cited

U.S. PATENT DOCUMENTS

| | | | |
|---|---|---|---|
| 4,015,799 A | * | 4/1977 | Koski et al. ........... G11B 27/13 |
| | | | 242/412.3 |
| 4,225,890 A | | 9/1980 | Takenaka et al. |
| 5,103,355 A | | 4/1992 | Steele |

(Continued)

OTHER PUBLICATIONS

"Protecting Your Archival Data With Improved Tape Dimensional Stability", Sun Oracle, Jan. 2011, pp. 1-9.

*Primary Examiner* — Craig A. Renner
(74) *Attorney, Agent, or Firm* — PATTERSON + SHERIDAN, LLP (57) ABSTRACT

The present disclosure generally relates to a tape drive comprising a tape wound around first and second tape reels and a tape head module configured to write data to and read data from the tape. The tape drive is configured to equalize the amount of time the tape spends stored in a first state and a second state when being stored long term, or when in a preservation phase, to minimize the effects of creep and tape dimensional stability. In the first state, a majority of the tape is wound around the first tape reel. In the second state, the majority of the tape is wound around the second tape reel. The tape drive is configured to move the tape between the first and second states: (1) upon being triggered by the timer, or (2) based on the tape head module being utilized to determine a position error signal.

20 Claims, 10 Drawing Sheets

(56) References Cited

U.S. PATENT DOCUMENTS

| | | | |
|---|---|---|---|
| 5,464,167 A * | 11/1995 | Fujisawa et al. | G11B 15/43 |
| | | | 242/412.2 |
| 6,690,535 B2 | 2/2004 | Wang | |
| 6,918,553 B2 | 7/2005 | Zwettler et al. | |
| 8,982,493 B2 | 3/2015 | Underkofler | |
| 10,679,658 B1 | 6/2020 | Winarski et al. | |
| 10,930,309 B1 | 2/2021 | Winarski et al. | |
| 11,562,769 B1 * | 1/2023 | Schreck et al. | G11B 15/32 |
| 2005/0018349 A1 | 1/2005 | Eaton | |
| 2022/0254375 A1 | 8/2022 | Kaneko et al. | |

* cited by examiner

METHODS FOR IMPROVING TRACK DENSITY IN DUAL-REEL REMOVABLE TAPE DEVICES AND FIXED TAPE DEVICES

CROSS-REFERENCE TO RELATED APPLICATIONS

This application claims benefit of U.S. provisional patent application Ser. No. 63/523,291, filed Jun. 26, 2023, which is herein incorporated by reference.

BACKGROUND OF THE DISCLOSURE

Field of the Disclosure

Embodiments of the present disclosure generally relate to a tape drive comprising a tape and a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

In tape drives, the magnetic media or tape is often removable, such that it can be replaced and/or stored. Tapes that are stored for long periods of time may stretch and/or compress both in tape length and width over time, referred to as creep or tape dimensional stability (TDS) effects, due to a variety of reasons, such as environmental causes like humidity and temperature, workload, stress applied on the tape, and general wear of the tape. The tape stretching and compressing causes different dimensional deformations that hinder the improvement of the track density of the tape while further making accurate positioning of the tape for future read and write operations more difficult.

Therefore, there is a need in the art for a tape drive capable of compensating for tape dimensional stability effects and creep.

SUMMARY OF THE DISCLOSURE

The present disclosure generally relates to a tape drive comprising a tape wound around first and second tape reels and a tape head module configured to write data to and read data from the tape. The tape drive is configured to equalize the amount of time the tape spends stored in a first state and a second state when being stored long term, or when in a preservation phase, to minimize the effects of creep and tape dimensional stability. In the first state, a majority of the tape is wound around the first tape reel. In the second state, the majority of the tape is wound around the second tape reel. The tape drive is configured to move the tape between the first and second states: (1) upon being triggered by the timer, or (2) based on the tape head module being utilized to determine a position error signal.

In one embodiment, a tape drive comprises a first tape reel, a second tape reel, and a tape head disposed between the first tape reel and the second tape reel, wherein a tape is configured to be wound around the first tape reel and the second tape reel, wherein, when storing the tape, the tape drive is configured to: (A) determine a first amount of time the tape spends in a first state, wherein, in the first state, a majority of the tape is wound around the first tape reel, (B) move the tape to a second state, wherein, in the second state, the majority of the tape is wound around the second tape reel, (C) determine a second amount of time the tape spends in the second state, (D) determine a difference between the first amount of time and the second amount of time, and (E) based on the difference, move the tape to the first state or remain in the second state.

In another embodiment, a tape drive comprises a first tape reel, a second tape reel, a tape comprising a first servo pattern, a second servo pattern, and a plurality of data tracks disposed between the first servo pattern and the second servo pattern, wherein the tape is wound around the first tape reel and the second tape reel, and a tape head disposed between the first tape reel and the second tape reel, the tape head comprising: a first servo element, a second servo element, and a plurality of data elements disposed between the first servo element and the second servo element, wherein the tape drive is configured to: (A) obtain a first position signal of the first servo element and a second position signal of the second servo element simultaneously at a plurality of locations across an entire length of the tape, (B) calculate an average difference between the first position signal and the second position signal, and (C) based on the average difference, move the tape to a first state, wherein a majority of the tape is wound around the first tape reel in the first state, move the tape to a second state, wherein the majority of the tape is wound around the second tape reel in the second state, or remain in a current state, the current state being the first state or the second state.

In yet another embodiment, a tape drive comprises a timer, a first tape reel, a second tape reel, a tape head disposed between the first tape reel and the second tape reel, a tape wound around the first tape reel and the second tape reel, means for recording a first amount of time the tape spends in a first state, wherein a majority of the tape is wound around the first tape reel in the first state, means for reading the recorded first amount of time upon a first trigger of the timer, means for moving the tape to a second state, wherein the majority of the tape is wound around the second tape reel in the second state, means for recording a second amount of time the tape spends in the second state, means for reading the recorded second amount of time, and means for determining a difference between the first amount of time and the second amount of time, wherein the tape drive is configured to move the tape to the first state or remain in the second state based on the difference.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape drive comprising a tape wound around first and second tape reels and a tape head module configured to write data to and read data from the tape. The tape drive is configured to equalize the amount of time the tape spends stored in a first state and a second state when being stored long term, or when in a preservation phase, to minimize the effects of creep and tape dimensional stability. In the first state, a majority of the tape is wound around the first tape reel. In the second state, the majority of the tape is wound around the second tape reel. The tape drive is configured to move the tape between the first and second states: (1) upon being triggered by the timer, or (2) based on the tape head module being utilized to determine a position error signal.

Figure 1A:
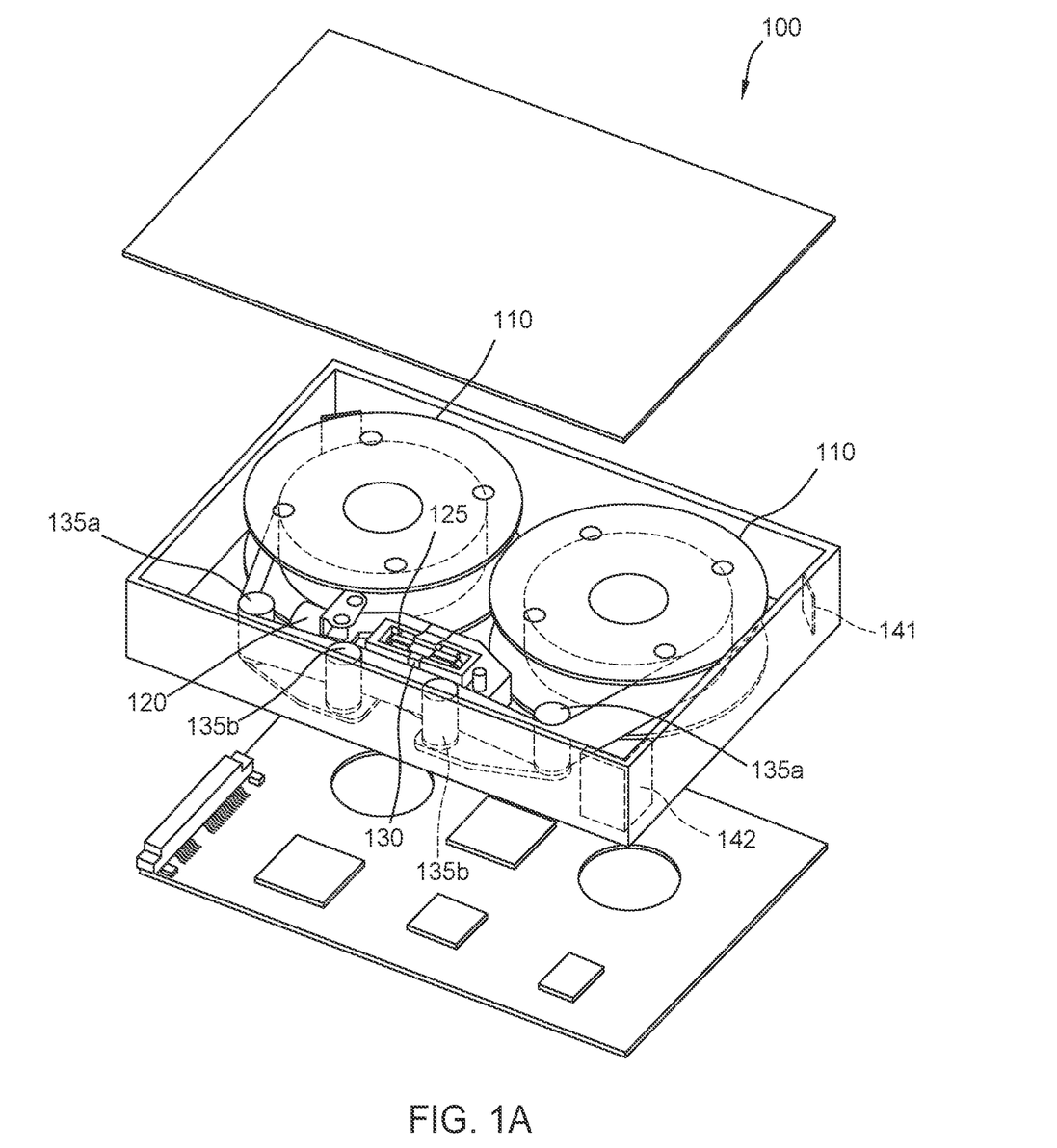
FIGS. 1A-1C illustrate a perspective exploded view, a simplified top down, and side profile view of a tape drive, in accordance with some embodiments.
Figure 1B:
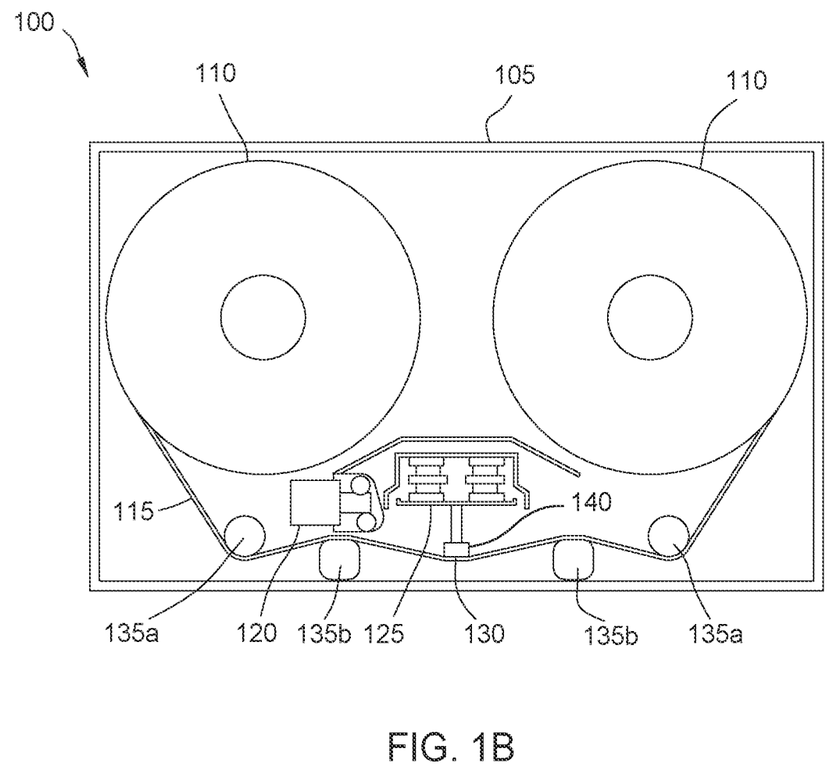
Figure 1C:
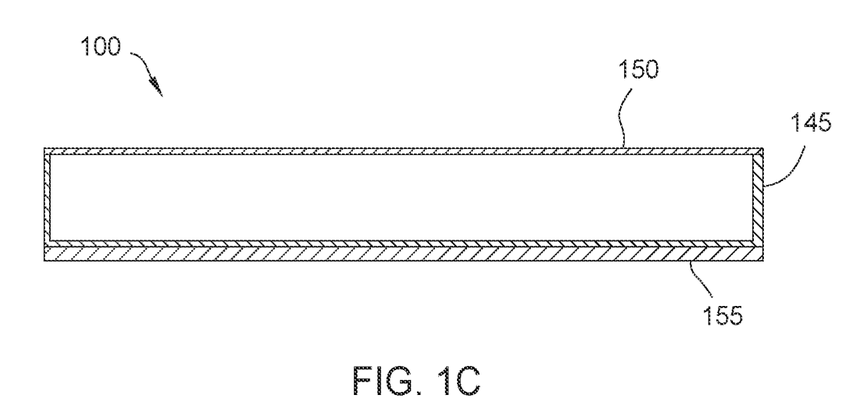

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
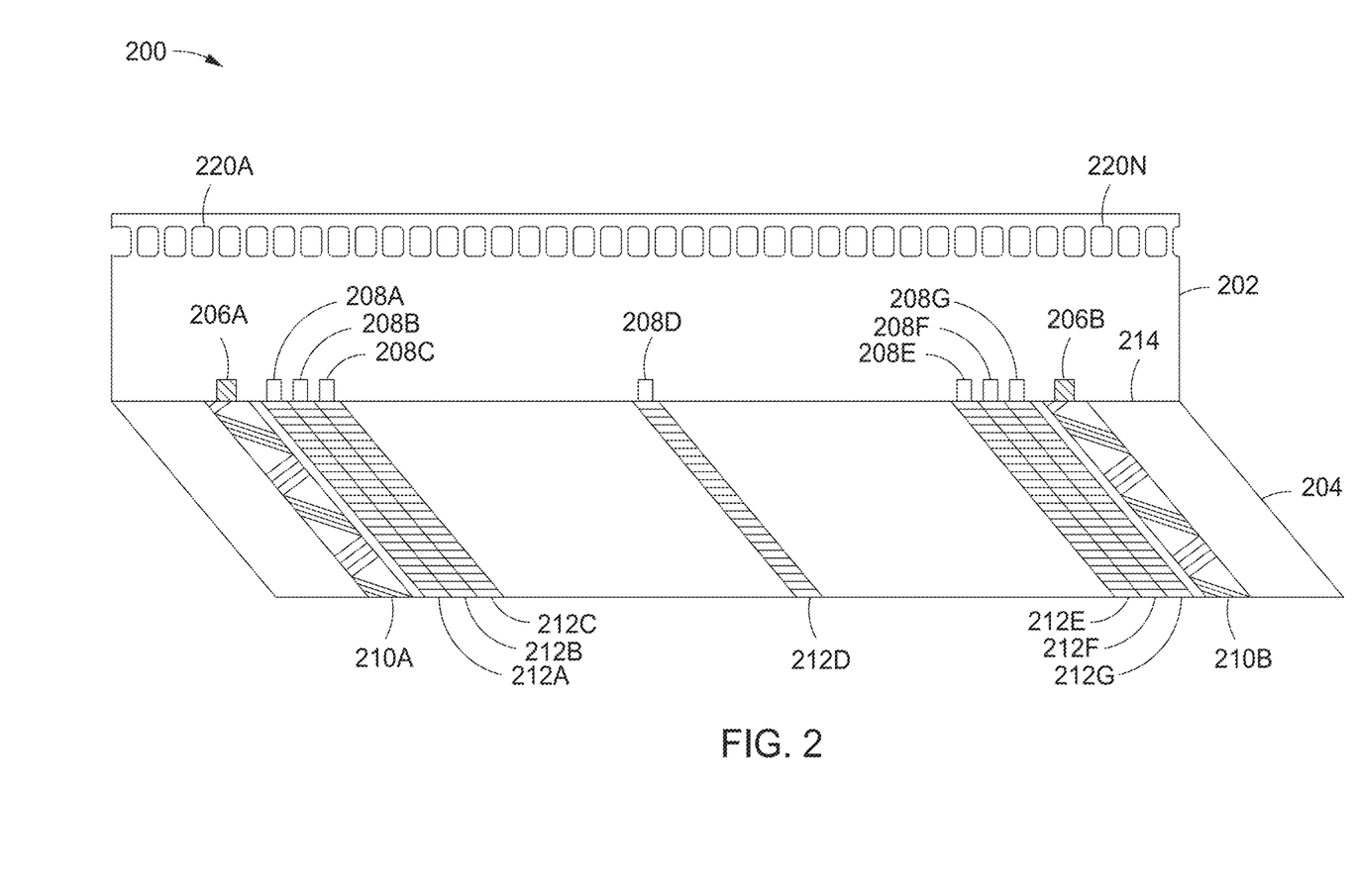
FIG. 2 is a schematic illustration of a tape head and tape that are aligned.

FIG. 2 is a schematic illustration of a tape head module assembly 200 and a tape 204 that are aligned. The tape head module assembly 200 comprises a tape head body 202 that is aligned with the tape 204. The tape 204 moves past the tape head module assembly 200 during read and/or write operations. The tape head module assembly 200 has a media facing surface (MFS) 214 that faces the tape 204. The tape head module assembly 200 is coupled to a controller, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data head (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
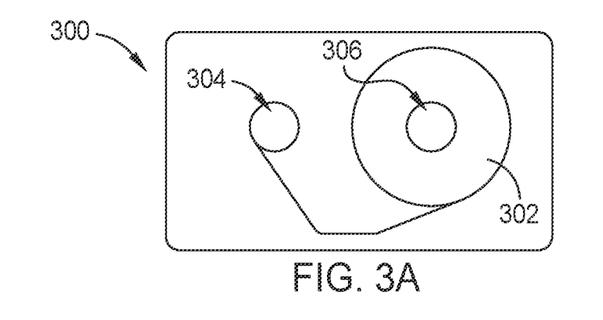
FIG. 3A illustrates a first condition of storing a tape conventionally.
Figure 3B:
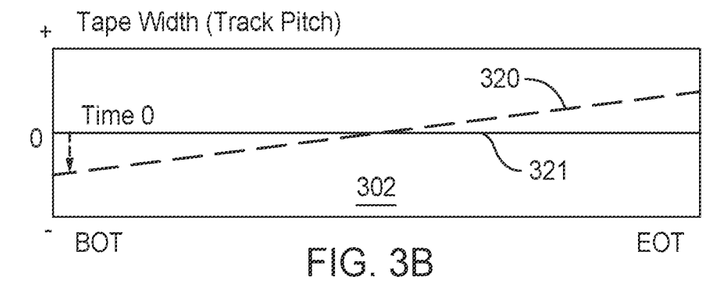
FIG. 3B illustrates the deformations of storing the tape using the first condition.
Figure 4A:
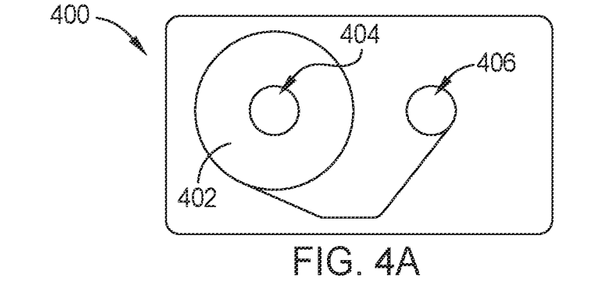
FIG. 4A illustrates a second condition of storing a tape conventionally.
Figure 4B:
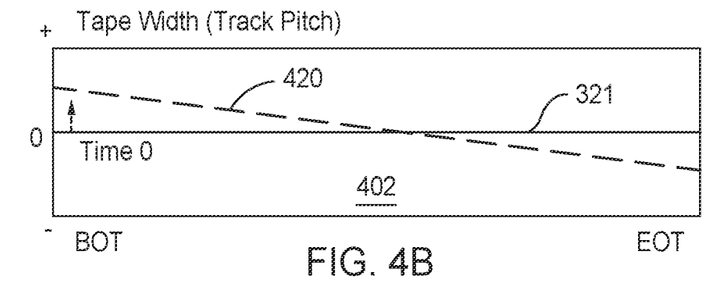
FIG. 4B illustrates the deformations of storing the tape using the second condition.
Figure 5A:
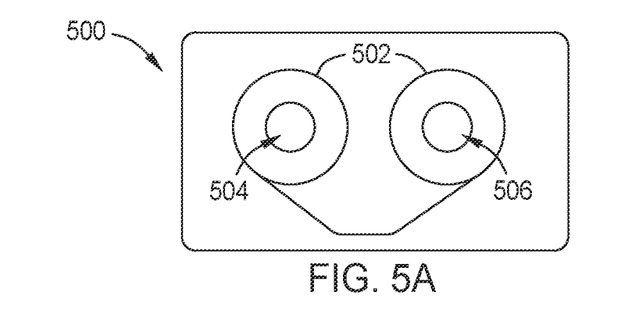
FIG. 5A illustrates a third condition of storing a tape conventionally.
Figure 5B:
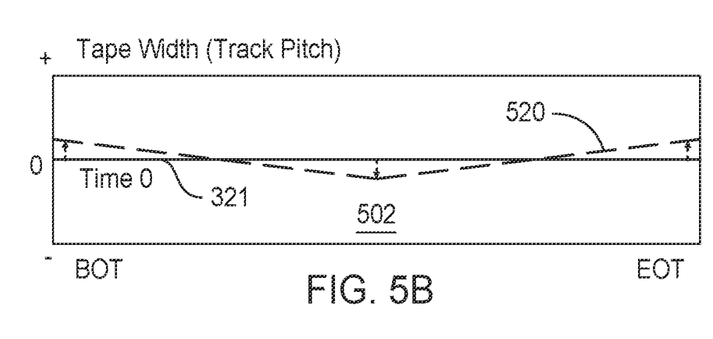
FIG. 5B illustrates the deformations of storing the tape using the third condition.

FIGS. 3A-5B illustrate conventional conditions or methods of storing a tape of a tape drive. FIG. 3A illustrates a first condition 300 of storing a tape 302, and FIG. 3B illustrates the deformations of storing the tape 302 using the first condition 300, represented by line 320. FIG. 4A illustrates a second condition 400 of storing a tape 402, and FIG. 4B illustrates the deformations of storing the tape 402 using the second condition 400, represented by line 420. FIG. 5A illustrates a third condition 500 of storing a tape 502, and FIG. 5B illustrates the deformations of storing the tape 502 using the third condition 500, represented by line 520. In FIGS. 3B, 4B, and 5B, the line 321 represents a width of a tape that has not experienced the effects of creep or TDS.

In the first condition 300 of storing a tape 302 shown in FIG. 3A, a first tape reel 304 has no or few turns of tape 302 wound around it, and a second tape reel 306 has all or most of the tape 302 wound around it. If the tape 302 is stored as shown in FIG. 3A for a long period of time, a width of the tape 302 becomes narrower (−) near beginning of the tape (BOT) and wider (+) near an end of the tape (EOT), like shown in FIG. 3B. As such, the track width of the tape 302 various along the width of the tape 302.

In the second condition 400 of storing a tape 402 shown in FIG. 4A, a first tape reel 404 has all or most of the tape 402 wound around it, and a second tape reel 406 has no or few turns of tape 402 wound around it, or the opposite of the first condition 300. If the tape 402 is stored as shown in FIG. 4A for a long period of time, a width of the tape 402 becomes wider near the BOT and narrower near the EOT, like shown in FIG. 4B. As such, the track width of the tape 402 various along the width of the tape 402.

In the third condition 500 of storing a tape 502 shown in FIG. 5A, a first tape reel 504 and a second tape reel 506 each have about the same length of tape 502 wound around them. If the tape 502 is stored as shown in FIG. 5A for a long period of time, a width of the tape 502 becomes narrower around the midpoint or midsection of the tape 502 (i.e., a central portion of the tape 502 disposed between the BOT and the EOT) and the tape 502 becomes wider at both the BOT and the EOT due to the effects of creep, like shown in FIG. 5B. As such, the track width of the tape 502 various along the width of the tape 502.

FIGS. 6A-6D illustrate the tape 302 of FIGS. 3A-3B being read by a tape head 610 of a tape drive after being stored like discussed in the first condition 300. As discussed above, a beginning portion 302a of the tape 302 extending from the BOT to line 601 has a narrower width or track pitch, a central portion 302b of the tape 302 extending from line 601 to line 603 has not been stretched or compressed, and an end portion 302c of the tape 302 extending from line 603 to the EOT has a wider width or track pitch.

Figure 6A:
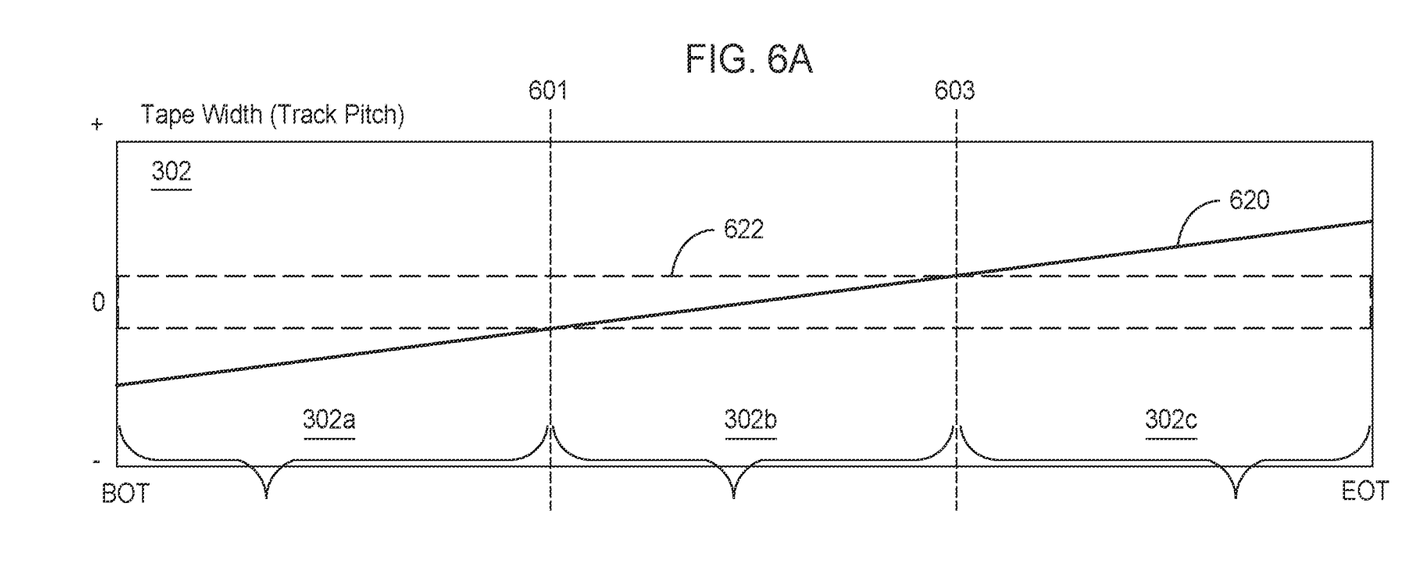
FIGS. 6A-6D illustrate the tape of FIGS. 3A-3B being read by a tape head of a tape drive after being stored in the first condition.

In FIG. 6A, the line 620 represents the width of the tape 302 after being stored, and the box 622 shows the area of the tape 302 where data is readable (e.g., a readable zone), or where a pitch of the data elements 612 is substantially equal to a pitch of the tracks 318 of the tape 302.

Figure 6B:
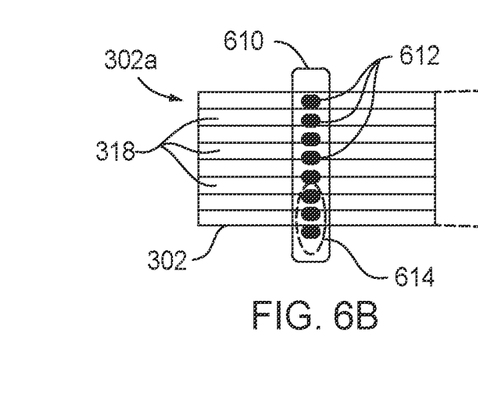

FIG. 6B shows the tape head 610 comprising a plurality of data elements 612, where each data element 612 comprises a write transducer and a read transducer, disposed over the beginning portion 302a of the tape 302. Each data element 612 of the tape head 610 should align with a track 318 of the tape 302. However, as shown by the circle 614, a number of data elements 612 are unaligned with their respective track 318, as the pitch of the data elements 612 is greater than the pitch of the tracks 318 due to the effects of creep and/or TDS causing the beginning portion 302a to be narrower. As such, the data written to the beginning portion 302a is not within the readable zone indicated by the box 622 of FIG. 6A, resulting in a read error.

Figure 6C:
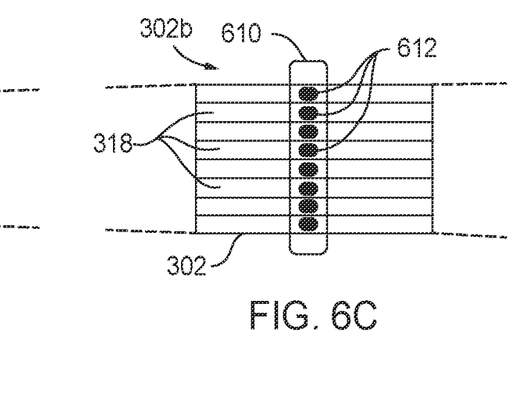

FIG. 6C shows the tape head 610 disposed over the central portion 302b of the tape 302. Since the central portion 302b did not experience the effects of creep and/or TDS as severely as the beginning portion 302a or the end portion 302c, the pitch of the data elements 612 is substantially equal to a pitch of the tracks 318 of the tape 302. As such, each data element 312 is substantially aligned with its respective track 318, and the data written to the central portion 302b is within the readable zone indicated by the box 622 of FIG. 6A.

Figure 6D:
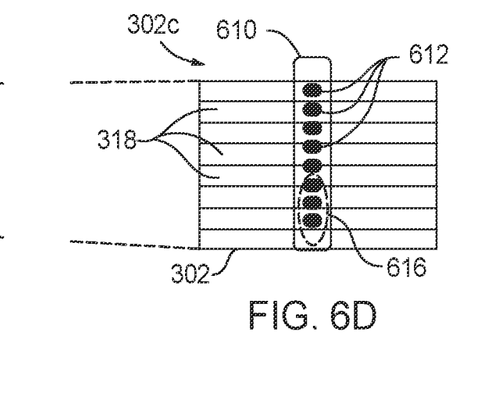

FIG. 6D shows the tape head 610 disposed over the end portion 302c of the tape 302. As shown by the circle 616, a number of data elements 612 are unaligned with their respective track 318, as the pitch of the data elements 612 is less than the pitch of the tracks 318 due to the effects of creep and/or TDS causing the beginning portion 302a to be wider. As such, the data written to the end portion 302c is not within the readable zone indicated by the box 622 of FIG. 6A, resulting in a read error.

Figure 7A:
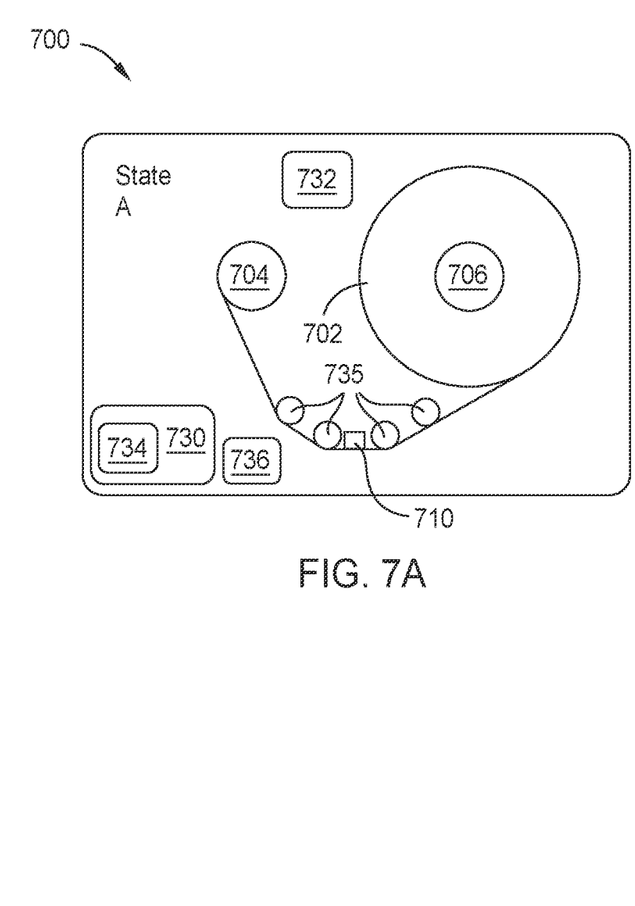
FIGS. 7A-7B illustrate a tape drive in two different states, state A and state B, according to various embodiments.
Figure 7B:
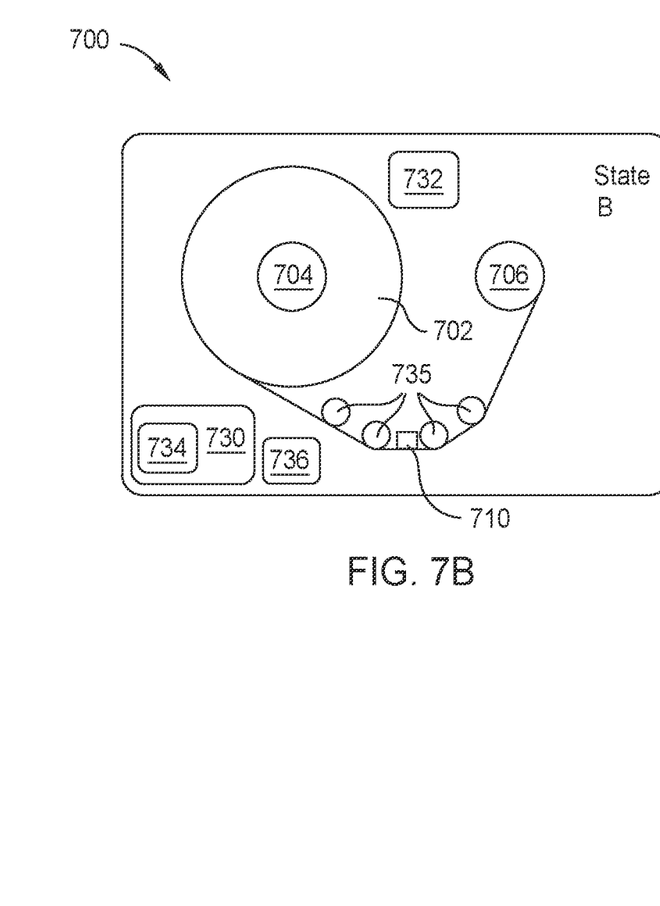
Figure 8A:
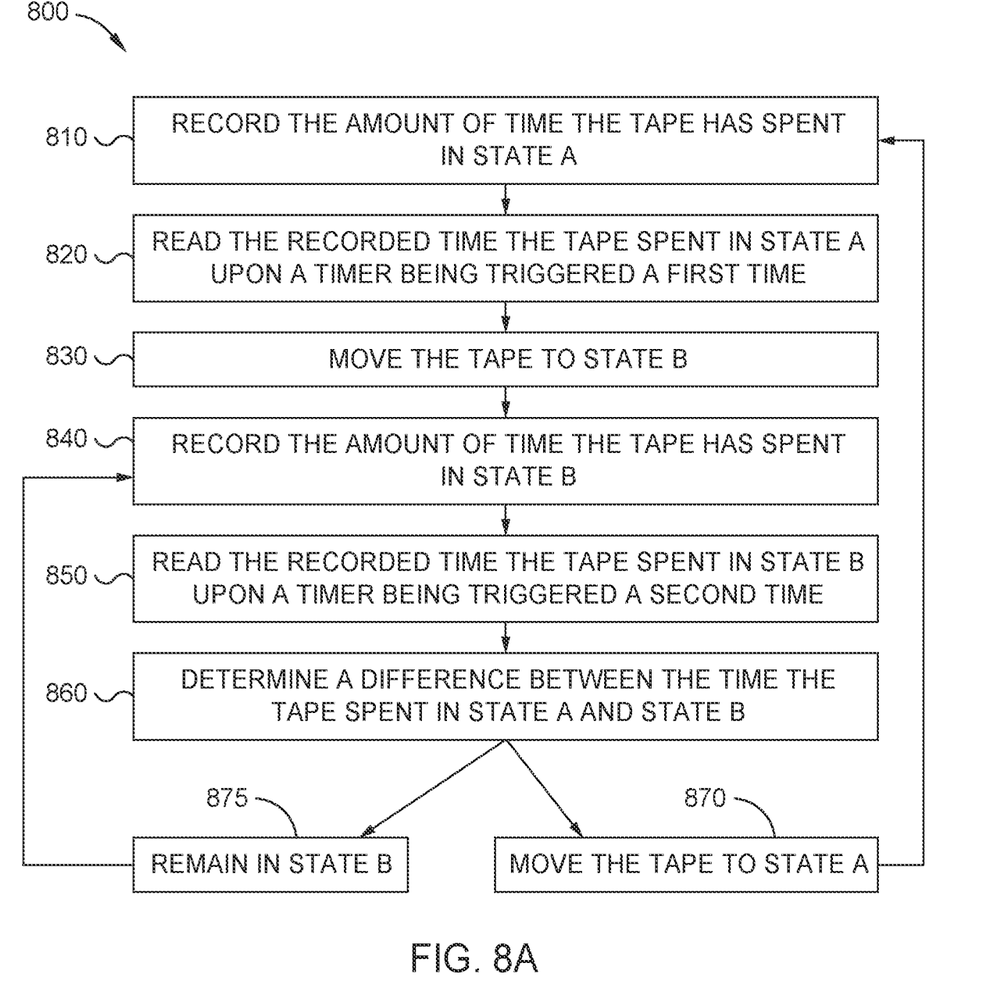
FIG. 8A illustrates a method of storing a tape of the tape drive of FIGS. 7A-7B, according to one embodiment.
Figure 8B:
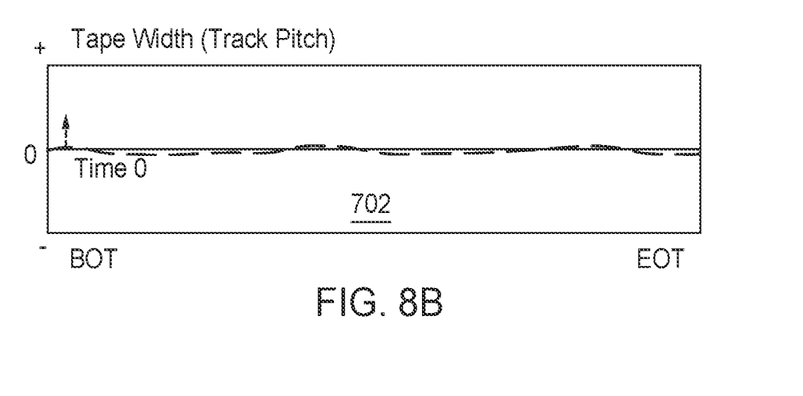
FIG. 8B illustrates the tape after being stored for a long period of time using the method of FIG. 8A, according to one embodiment.

FIGS. 7A-7B illustrate a tape drive 700 in two different states, state A and state B, according to various embodiments. FIG. 8A illustrates a method 800 of storing a tape 702 of the tape drive 700, according to one embodiment. FIG. 8B illustrates the tape 702 after being stored for a long period of time using the method 800 of FIG. 8A, according to one embodiment. The tape drive 700 may be the tape drive 100 of FIGS. 1A-1C. The tape drive 700 may comprise the tape head module assembly 200 of FIG. 2.

The tape drive 700 comprises a first tape reel 704 and a second tape reel 706, around which the tape 702 is wound. The tape 702 is biased against one or more guides/rollers 735 and is movably passed along a head assembly or tape head 710 by movement of the reels 704, 706 using a reel motor 732. The reel motor 732 is coupled to each tape reel 704, 706, and is configured to rotate the tape reels 704, 706. The tape head 710 comprises a plurality of data elements 712 (shown in FIGS. 9A-9C), where each data element 712 comprises a write transducer and a read transducer. The tape head 710 may be the tape head module assembly 200 of FIG. 2. Thus, the tape head 710 may be referred to herein as a tape head module.

The tape drive 700 further comprises a controller 730, a memory unit 734, such as a non-volatile memory unit or a tape cartridge, and a timer 736. The memory unit 734 may be within the controller 730, or the memory unit 734 may be separate from the controller 730. The timer 736 may be coupled to the memory unit 734. In some embodiments, the timer 736 is optional if a host device (not shown) comprises a timer. The timer 736 may be within the controller 730, or the timer 736 may be separate from the controller 730.

FIG. 7A illustrates the tape drive 700 storing the tape 702 in state A, or a first state. In state A, the first tape reel 704 has no or few turns of tape 702 wound around it, and the second tape reel 706 has all or most of the tape 702 wound around it. FIG. 7B illustrates the tape drive 700 storing the tape 702 in state B, or a second state. In state B, the first tape reel 704 has all or most of the tape 702 wound around it, and the second tape reel 706 has no or few turns of tape 702 wound around it. Utilizing the method 800 of FIG. 8, the tape 702 spends substantially the same amount of time in both state A and in state B, as discussed below.

FIG. 8A illustrates a method 800 of storing the tape 702 of the tape drive 700, according to one embodiment. It is assumed in the method 800 that the tape 702 starts off being stored in state A shown in FIG. 7A; however, the tape 702 may instead start off being stored in state B shown in FIG. 7B.

In operation 810, the amount of time the tape 702 spends stored in state A is determined, such as by recording the amount of time. While recording is used herein as a method of determining the amount of time spent in a particular state, recording is merely an example, and other methods may be used as well. The amount of time is stored in the memory unit 734, and may be recorded using the timer 736 or the controller 730. Upon the timer 736 being triggered a first time after a predetermined amount of time has passed, such as several days to several months, the controller 730 is configured to read the amount of time recorded in operation 820. The predetermined amount of time may vary depending on the validation of each tape drive system.

In operation 830, the tape 702 is moved to state B. The amount of time the tape 702 spends stored in state B is determined, such as by recording the amount of time, in operation 840. The amount of time is stored in the memory unit 734, and may be recorded using the timer 736 or the controller 730. Upon the timer 736 being triggered a second time after the predetermined amount of time has passed, the controller 730 is configured to read the amount of time recorded in operation 850. The predetermined amount of time to trigger the timer 736 may be the same in both operations 820 and 850.

In operation 860, a different between the amount of time the tape 702 spent stored in state A and state B is determined, such as by the controller 730. If the difference between the amounts of time the tape 702 spent stored in state A and state B indicates that the tape 702 spent more time in state B than in state A, the method 800 proceeds to operation 870. In operation 870, the tape 702 is moved back to state A, and the method 800 starts over and proceeds from operation 810. If the difference between the amounts of time the tape 702 spent stored in state A and state B indicates that the tape 702 spent more time in state A than in state B, the method 800 proceeds to operation 875, rather than to operation 870. In operation 875, the tape 702 remains in state B, and the method 800 then proceeds to continue from to operation 840. If the difference between the amounts of time the tape 702 spent stored in state A and state B is determined to be substantially the same, the method 800 may proceed to either operation 870 or to operation 875 in order to make the amount of time spent in state A equal to the amount of time spent in state B.

By recording the amount of time the tape 702 spends in both state A and in state B, the tape 702 can be adjusted to equalize the amounts of time spent in state A and state B to reduce the effects of creep and TDS. FIG. 8B illustrates the tape 702 after having been stored using the method 800. As shown in FIG. 8B, the entire length of the tape 702, from the BOT to the EOT, has very little or no width variations. Thus, there are no portions of the tape 702 that are outside of a readable zone.

Figure 9A:
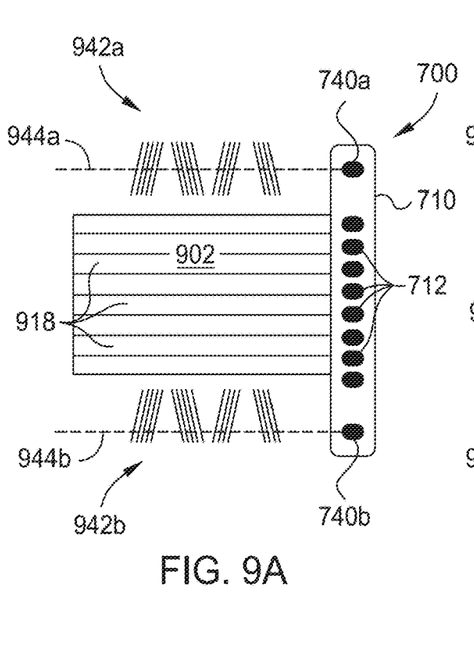
FIGS. 9A-9C illustrate the tape drive of FIGS. 7A-7B reading a tape after the tape has been stored in various different states, according to another embodiment.
Figure 9B:
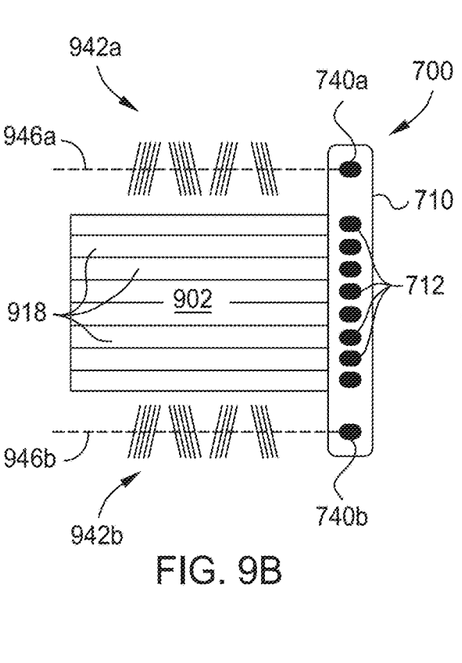
Figure 9C:
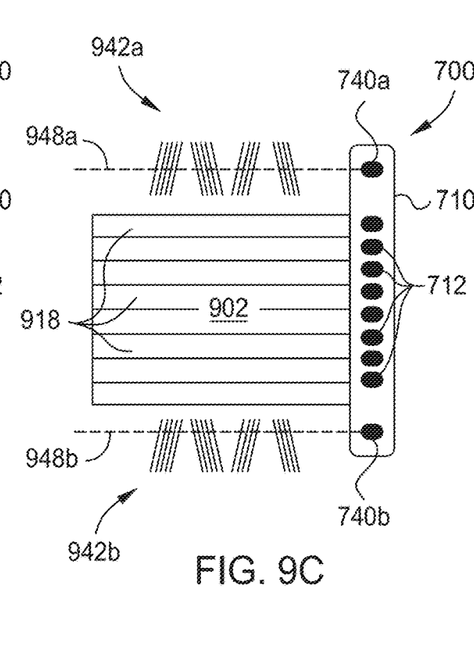

FIGS. 9A-9C illustrate the tape drive 700 of FIGS. 7A-7B reading a tape 902 after the tape 902 has been stored in various different states, according to another embodiment. FIG. 9A illustrates a portion of the tape 902 being stored in state A, shown in FIG. 7A, FIG. 9B illustrates a portion of the tape 902 being stored in a manner resulting in the tape 902 having little to no width variations, like shown in FIG. 8B, and FIG. 9C illustrates a portion of the tape 902 being stored in state B, shown in FIG. 7B. FIGS. 9A-9C may represent different portions across a length of the same tape 902.

In addition to comprising the plurality of data elements 712, the tape head 710 further comprises a first servo head 740a and a second servo head 740b. The plurality of data elements 712 are disposed between the first servo head 740a and the second servo head 740b. The tape 902 comprises a first servo pattern 942a and a second servo pattern 942b, where the plurality of data tracks 918 of the tape 902 are disposed between the first servo pattern 942a and the second servo pattern 942b. The first servo head 740a is configured to read the first servo pattern 942a and the second servo head 740b is configured to read the second servo pattern 942b. Each servo pattern 942a, 942b comprises a plurality of lines arranged in a chevron pattern. The servo heads 740a, 740b read the servo patterns 942a, 942b in order to determine the positioning of the tape head 710, as well as to determine a state of the tape 902, such as whether the tape 902 has being wider or narrower in portions. The servo heads 740a, 740b may be referred to herein as servo elements or servo readers.

Figure 10:
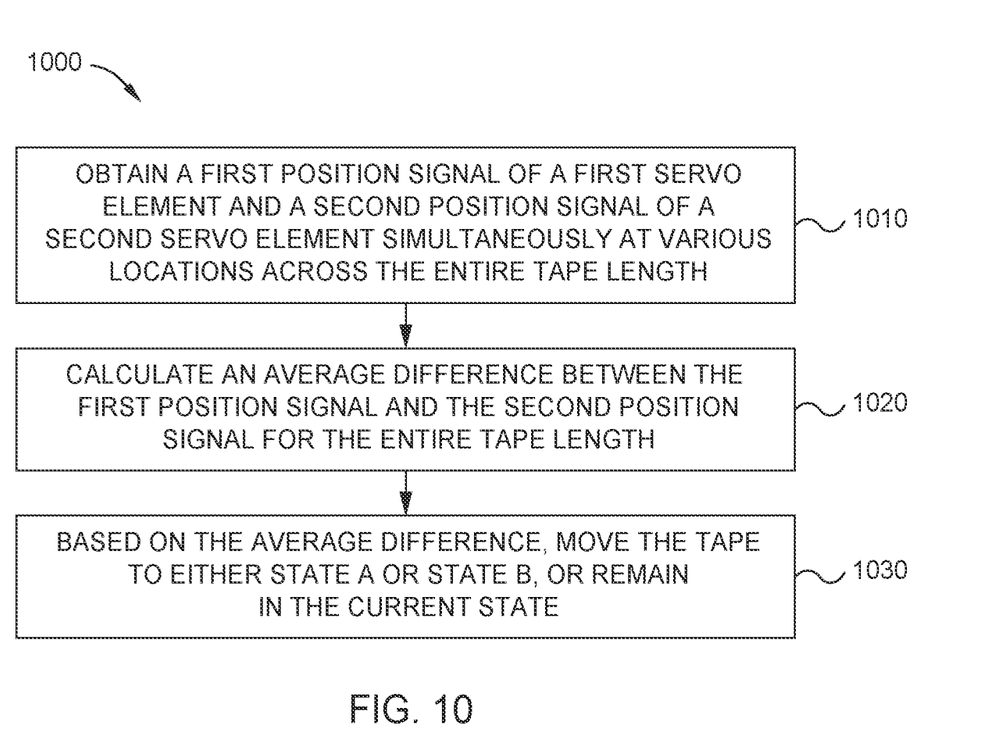
FIG. 10 illustrates a method of storing the tape of the tape drive of FIGS. 7A-7B using the first and second servo heads, according to another embodiment.

FIG. 10 illustrates a method 1000 of storing the tape 902 of the tape drive 700 using the first and second servo heads 740a, 740b, according to another embodiment.

In operation 1010, the tape head 710 obtains a first position signal of a first servo head 740a and a second position signal of a second servo head 740b simultaneously at various locations across the entire length of the tape 902. For example, in FIG. 9A, the first servo head 740a has a first position signal 944a when reading the first servo pattern 942a; in FIG. 9B, the first servo head 740a has a first position signal 946a when reading the first servo pattern 942a; and in FIG. 9C, the first servo head 740a has a first position signal 948a when reading the first servo pattern 942a. The first position signals 944a, 946a, and 948a are all substantially aligned with the center of the first servo pattern 942a.

In FIG. 9A, the second servo head 740b has a second position signal 944b when reading the second servo pattern 942b; in FIG. 9B, the second servo head 740b has a second position signal 946b when reading the second servo pattern 942b; and in FIG. 9C, the second servo head 740b has a second position signal 948b when reading the second servo pattern 942b. In FIG. 9A, the second position signal 944b is towards a bottom of the second servo pattern 942b (i.e., further from the data tracks 918). In FIG. 9B, the second position signal 946b is substantially aligned with the center of the second servo pattern 942b, and thus, at a same location as the first position signal 946a. In FIG. 9C, the second position signal 948b is towards a top of the second servo pattern 942b (i.e., closer to the data tracks 918).

In operation 1020, an average difference between the first position signal and the second position signal across the length of the tape 902 is calculated to determine a delta position error signal (PES). The delta PES is a measurement of the degree of the tape 902 width expansion and contraction. By determining the delta PES over the entire tape length, it is possible to determine whether the average tape width variation is close to state A (shown in FIG. 7A) or to state B (shown in FIG. 7B).

In operation 1030, the tape 902 is moved to either state A or state B based on the average difference. In FIG. 9A, the average difference between the first position signal 944a and the second position signal 944b indicates that the overall width of the tape 902 has narrowed due to creep. In other words, the average difference indicates that the first position signal 944a is spaced too far from the second position signal 944b. Thus, the tape 902 would be moved to state B to counter the effects of being in state A for too long.

In FIG. 9B, the average difference between the first position signal 946a and the second position signal 946b indicates that the overall width of the tape 902 has not altered much, if any. In other words, the average difference indicates that the first servo position 946a aligns with the second position signal 946b. As such, the tape 902 may remain in whatever state it is currently in.

In FIG. 9C, the average difference between the first position signal 948a and the second position signal 948b indicates that the overall width of the tape 902 has widened due to creep. In other words, the average difference indicates that the first position signal 948a is spaced too close to the second position signal 948b. Thus, the tape 902 would be moved to state A to counter the effects of being in state B for too long.

Upon completion of operation 1030, the method 1000 repeats one or more times, or as needed. In some embodiments, the method 1000 is triggered by a timer 736 after a predetermined time.

Figure 11:
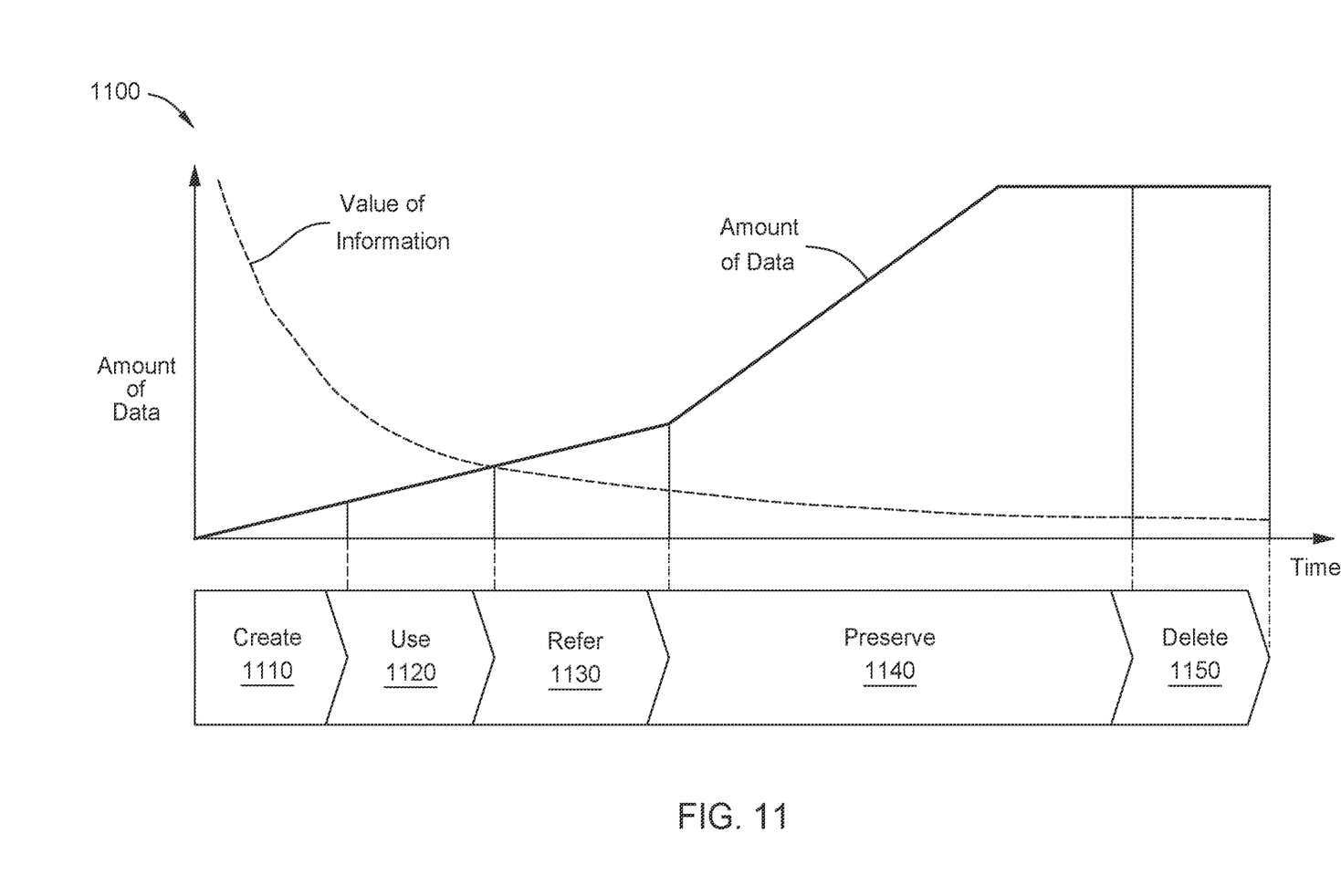
FIG. 11 illustrates a graph of a life cycle of a tape drive, according to one embodiment.

FIG. 11 illustrates a graph 1100 of a life cycle of a tape drive, such as the tape drive 700 of FIGS. 7A-7B, according to one embodiment. In the graph 1100, the y-axis represents the amount of data stored to the tape drive, and the x-axis represents time.

In a first phase 1110, or the create phase 1110, of the graph 1100, new information is written to the tape, such as the tape 702 or the tape 902. When data is created and written to the tape, the value of the data is at its highest, meaning that there are few to no errors when reading the data or writing the data to the tape. After the data is written in the first phase 1110, the data is used in the second phase 1120, or the use phase 1120. Using the data may involve writing new data, analyzing the data, and/or processing the data.

In the third phase 1130, or the reference phase 1130, the data written in phases 1110 and 1120 is referred to a plurality of times. Referring to the data may include retrieving and reading any written data. When the tape drive 700 is in the refer phase 1130, the tape is in a state C, which emphasizes access performance for retrieval of data. In state C, the tape is alternatingly and repeatedly moved between state A and state B as needed to locate where particular data is stored. As such, there is very little creep or TDS effects on the tape, as the tape is not left in a particular state for a prolonged period of time.

In the fourth phase 1140, or the preserve phase 1140, the tape drive 700 goes into a preservation mode, where the tape, and the data stored on the tape, are securely stored for a long period of time. In the preserve phase 1140, access to stored data is very rare. As noted by the graph 1100, the tape drive 700 is in the preserve phase 1140 is a substantially greater amount of time than it is in any of the create, use, and/or reference phases 1110, 1120, 1130. The value of the data or information stored on the tape decreases rapidly from the create phase 1110 throughout the preserve phase 1140. Conversely, the amount of data stored on the tape increases from the create phase 1110 throughout the preserve phase 1140. In the fifth phase 1150, or the delete phase 1150, the data stored on the tape is securely erased.

In general, the tape drive 700 spends the majority of the time in the reference phase 1130 and in the preserve phase 1140. The tape drive 700 may determine what phase the tape and/or data is in by measuring how often data is accessed. If the frequency of accessing data decreases below a certain threshold or level, the tape drive 700 can then determine that the tape has entered the preservation phase 1140. Upon determining that the tape is in the preservation phase 1140, the tape drive 700 may then implement either method 800 of FIG. 8A or method 1000 of FIG. 10 to reduce the effects of creep and TDS.

Alternatively, a host drive (not shown) coupled to the tape drive 700 may determine what phase the tape drive 700 and/or tape are in. The host drive may prepare a command that distinguishes between the reference phase 1130 and the preservation phase 1140. When the host device recognizes that the reference phase 1130 has ended, the host device may then send a command to the tape drive to move to the preservation phase 1140. Upon entering the preservation phase 1140, the tape drive 700 may then implement either method 800 of FIG. 8A or method 1000 of FIG. 10 to reduce the effects of creep and TDS. Thus, both method 800 and method 1000 may be individually implemented upon determining which phase the tape is in, or upon receiving a command to enter a particular phase.

Therefore, by ensuring a tape spends an equal amount of time in both state A and state B, the effects of creep and TDS can be minimized. Minimizing the effects of creep and TDS result in the tape having a greater lifetime, and protects the reliability and integrity of the data stored on the tape. As such, controlling the amount of tape wound around each tape reel enables the tape to have a narrower track width, thus increasing the storage capacity of the tape drive.

In one embodiment, a tape drive comprises a first tape reel, a second tape reel, and a tape head disposed between the first tape reel and the second tape reel, wherein a tape is configured to be wound around the first tape reel and the second tape reel, wherein, when storing the tape, the tape drive is configured to: (A) determine a first amount of time the tape spends in a first state, wherein, in the first state, a majority of the tape is wound around the first tape reel, (B) move the tape to a second state, wherein, in the second state, the majority of the tape is wound around the second tape reel, (C) determine a second amount of time the tape spends in the second state, (D) determine a difference between the first amount of time and the second amount of time, and (E) based on the difference, move the tape to the first state or remain in the second state.

The tape drive is configured to repeat preforming (A)-(E) one or more times, and wherein (A)-(E) are performed when in a preservation phase where data stored on the tape is rarely or never accessed. The tape drive further comprises a memory device, wherein the first amount of time and the second amount of time are recorded to the memory device. The tape drive further comprises a timer, wherein the tape drive is further configured to: upon a first trigger of the timer, read the recorded first amount of time prior to moving the tape to the second state, and upon a second trigger of the time, read the recorded second amount of time prior to determining the difference. If the difference determined shows the tape spent more time in the second state than in the first state, the tape drive is configured to move the tape to the first state, and if the difference determined shows the tape spent more time in the first state than in the second state, the tape drive is configured to remain in the second state. If the difference determined shows the first amount of time is substantially equal to the second amount of time, the tape is moved to the first state, or the tape remains in the second state.

In another embodiment, a tape drive comprises a first tape reel, a second tape reel, a tape comprising a first servo pattern, a second servo pattern, and a plurality of data tracks disposed between the first servo pattern and the second servo pattern, wherein the tape is wound around the first tape reel and the second tape reel, and a tape head disposed between the first tape reel and the second tape reel, the tape head comprising: a first servo element, a second servo element, and a plurality of data elements disposed between the first servo element and the second servo element, wherein the tape drive is configured to: (A) obtain a first position signal of the first servo element and a second position signal of the second servo element simultaneously at a plurality of locations across an entire length of the tape, (B) calculate an average difference between the first position signal and the second position signal, and (C) based on the average difference, move the tape to a first state, wherein a majority of the tape is wound around the first tape reel in the first state, move the tape to a second state, wherein the majority of the tape is wound around the second tape reel in the second state, or remain in a current state, the current state being the first state or the second state.

The average difference indicates that the first position signal is spaced a distance over a first threshold away from the second position signal, the tape is moved to the second state. The average difference indicates that the first position signal is spaced a distance over a second threshold near to the second position signal, the tape is moved to the first state. The average difference indicates that the first position signal is substantially aligned with the second position signal, the tape remains in the current state. The tape drive is configured to determine a phase of the tape prior to obtaining the first position signal and the second position signal. The tape drive is configured to receive a command to enter a preservation phase prior to obtaining the first position signal and the second position signal. The tape drive further comprises a timer, wherein the tape drive is configured to obtain the first position signal and the second position signal upon the timer being triggered one or more times. The tape drive is configured to repeat preforming (A)-(C) one or more times, and wherein (A)-(C) are performed when in a preservation phase where data stored on the tape is rarely or never accessed.

In yet another embodiment, a tape drive comprises a timer, a first tape reel, a second tape reel, a tape head disposed between the first tape reel and the second tape reel, a tape wound around the first tape reel and the second tape reel, means for recording a first amount of time the tape spends in a first state, wherein a majority of the tape is wound around the first tape reel in the first state, means for reading the recorded first amount of time upon a first trigger of the timer, means for moving the tape to a second state, wherein the majority of the tape is wound around the second tape reel in the second state, means for recording a second amount of time the tape spends in the second state, means for reading the recorded second amount of time, and means for determining a difference between the first amount of time and the second amount of time, wherein the tape drive is configured to move the tape to the first state or remain in the second state based on the difference.

The preservation phase is a phase of the tape when data of the tape is rarely or never accessed. The tape drive further comprises means for determining when the tape is in the preservation phase. The tape drive is configured to receive a command to enter the preservation phase. The tape drive further comprises a non-volatile memory device, wherein the first amount of time and the second amount of time are recorded to the non-volatile memory device. If the difference determined shows the tape spent more time in the second state than in the first state, the tape drive is configured to move the tape to the first state, and if the difference determined shows the tape spent more time in the first state than in the second state, the tape drive is configured to remain in the second state.

While the foregoing is directed to embodiments of the present disclosure, other and further embodiments of the disclosure may be devised without departing from the basic scope thereof, and the scope thereof is determined by the claims that follow.

What is claimed is:
1. A tape drive, comprising:
a first tape reel;
a second tape reel; and
a tape head disposed between the first tape reel and the second tape reel,
wherein a tape is configured to be wound around the first tape reel and the second tape reel,
wherein, when storing the tape, the tape drive is configured to:
 (A) determine a first amount of time the tape spends in a first state, wherein, in the first state, a majority of the tape is wound around the first tape reel;
 (B) move the tape to a second state, wherein, in the second state, the majority of the tape is wound around the second tape reel;
 (C) determine a second amount of time the tape spends in the second state;
 (D) determine a difference between the first amount of time and the second amount of time; and
 (E) based on the difference, move the tape to the first state or remain in the second state.

2. The tape drive of claim 1, wherein the tape drive is further configured to repeat preforming (A)-(E) one or more times, and wherein (A)-(E) are performed when in a preservation phase where data stored on the tape is rarely or never accessed.

3. The tape drive of claim 1, further comprising a memory device, wherein the first amount of time and the second amount of time are recorded to the memory device.

4. The tape drive of claim 3, further comprising a timer, wherein the tape drive is further configured to:
upon a first trigger of the timer, read the recorded first amount of time prior to moving the tape to the second state; and
upon a second trigger of the time, read the recorded second amount of time prior to determining the difference.

5. The tape drive of claim 1, wherein:
if the difference determined shows the tape spent more time in the second state than in the first state, the tape drive is further configured to move the tape to the first state; and
if the difference determined shows the tape spent more time in the first state than in the second state, the tape drive is further configured to remain in the second state.

6. The tape drive of claim 1, wherein if the difference determined shows the first amount of time is substantially equal to the second amount of time, the tape is moved to the first state, or the tape remains in the second state.

7. A tape drive, comprising:
a first tape reel;
a second tape reel;
a tape comprising a first servo pattern, a second servo pattern, and a plurality of data tracks disposed between the first servo pattern and the second servo pattern, wherein the tape is wound around the first tape reel and the second tape reel; and
a tape head disposed between the first tape reel and the second tape reel, the tape head comprising:
  a first servo element;
  a second servo element; and
  a plurality of data elements disposed between the first servo element and the second servo element,
wherein the tape drive is configured to:
  (A) obtain a first position signal of the first servo element and a second position signal of the second servo element simultaneously at a plurality of locations across an entire length of the tape;
  (B) calculate an average difference between the first position signal and the second position signal; and
  (C) based on the average difference,
    move the tape to a first state, wherein a majority of the tape is wound around the first tape reel in the first state,
    move the tape to a second state, wherein the majority of the tape is wound around the second tape reel in the second state, or
    remain in a current state, the current state being the first state or the second state.

8. The tape drive of claim 7, wherein the average difference indicates that the first position signal is spaced a distance over a first threshold away from the second position signal, the tape is moved to the second state.

9. The tape drive of claim 7, wherein the average difference indicates that the first position signal is spaced a distance over a second threshold near to the second position signal, the tape is moved to the first state.

10. The tape drive of claim 7, wherein the average difference indicates that the first position signal is substantially aligned with the second position signal, the tape remains in the current state.

11. The tape drive of claim 7, wherein the tape drive is further configured to determine a phase of the tape prior to obtaining the first position signal and the second position signal.

12. The tape drive of claim 7, wherein the tape drive is further configured to receive a command to enter a preservation phase prior to obtaining the first position signal and the second position signal.

13. The tape drive of claim 7, further comprising a timer, wherein the tape drive is further configured to obtain the first position signal and the second position signal upon the timer being triggered one or more times.

14. The tape drive of claim 7, wherein the tape drive is further configured to repeat preforming (A)-(C) one or more times, and wherein (A)-(C) are performed when in a preservation phase where data stored on the tape is rarely or never accessed.

15. A tape drive, comprising:
a timer;
a first tape reel;
a second tape reel;
a tape head disposed between the first tape reel and the second tape reel;
a tape wound around the first tape reel and the second tape reel,
means for recording a first amount of time the tape spends in a first state, wherein a majority of the tape is wound around the first tape reel in the first state;
means for reading the recorded first amount of time upon a first trigger of the timer;
means for moving the tape to a second state, wherein the majority of the tape is wound around the second tape reel in the second state;
means for recording a second amount of time the tape spends in the second state;
means for reading the recorded second amount of time; and
means for determining a difference between the first amount of time and the second amount of time,
wherein the tape drive is configured to move the tape to the first state or remain in the second state based on the difference.

16. The tape drive of claim 15, further comprising means for determining when the tape is in a preservation phase.

17. The tape drive of claim 16, wherein the preservation phase is a phase of the tape when data of the tape is rarely or never accessed.

18. The tape drive of claim 16, wherein the tape drive is further configured to receive a command to enter the preservation phase.

19. The tape drive of claim 15, further comprising a non-volatile memory device, wherein the first amount of time and the second amount of time are recorded to the non-volatile memory device.

20. The tape drive of claim 15, wherein:
if the difference determined shows the tape spent more time in the second state than in the first state, the tape drive is further configured to move the tape to the first state; and
if the difference determined shows the tape spent more time in the first state than in the second state, the tape drive is further configured to remain in the second state.

* * * * *